United States Patent
Masuda et al.

(10) Patent No.: US 8,480,308 B2
(45) Date of Patent: Jul. 9, 2013

(54) TAPERED ROLLER BEARING, TAPERED ROLLER BEARING APPARATUS, AND AUTOMOTIVE PINION SHAFT SUPPORTING APPARATUS UTILIZING SAME TAPERED ROLLER BEARING APPARATUS

(75) Inventors: Naoki Masuda, Nara (JP); Kazutoshi Toda, Tondabayashi (JP); Hiroki Matsuyama, Nara (JP); Kouji Kawaguchi, Izumi (JP); Hiroyuki Ohshima, Kashihara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 1404 days.

(21) Appl. No.: 11/504,761

(22) Filed: Aug. 16, 2006

(65) Prior Publication Data
US 2007/0041677 A1 Feb. 22, 2007

(30) Foreign Application Priority Data
Aug. 18, 2005 (JP) ................................ P2005-237724

(51) Int. Cl.
F16C 19/36 (2006.01)
F16H 57/04 (2010.01)

(52) U.S. Cl.
USPC ............ 384/571; 384/564; 384/565; 384/568

(58) Field of Classification Search
USPC .................................. 384/564, 565, 568, 571
See application file for complete search history.

(56) References Cited

U.S. PATENT DOCUMENTS

| | | | |
|---|---|---|---|
| 5,007,747 A | 4/1991 | Takeuchi et al. | |
| 5,711,738 A | 1/1998 | Abe et al. | |
| 6,086,261 A | 7/2000 | Nakagawa et al. | |
| 6,318,897 B1 * | 11/2001 | Shitsukawa et al. | 384/450 |
| 6,390,685 B1 | 5/2002 | Shimomura et al. | |
| 6,513,985 B2 | 2/2003 | Unno et al. | |
| 2001/0012420 A1 | 8/2001 | Unno et al. | |
| 2002/0044707 A1 | 4/2002 | Hanai et al. | |
| 2002/0102041 A1 | 8/2002 | Matsuyama et al. | |

FOREIGN PATENT DOCUMENTS

| | | |
|---|---|---|
| EP | 0 756 095 A2 | 1/1997 |
| GB | 2 341 211 A | 3/2008 |
| JP | 54-089147 A | 7/1979 |
| JP | 3-113 | 1/1991 |
| JP | 3-12015 | 2/1991 |
| JP | 4-95318 | 8/1992 |
| JP | 4-331813 A | 11/1992 |
| JP | 8-177851 | 7/1996 |

(Continued)

OTHER PUBLICATIONS

Japanese Office Action dated Dec. 1, 2009 with English-language translation.

(Continued)

*Primary Examiner* — William C Joyce
(74) *Attorney, Agent, or Firm* — McGinn IP Law Group, PLLC (57) ABSTRACT

A tapered roller bearing includes an outer ring, an inner ring, a plurality of tapered rollers interposed between the outer ring and the inner ring, and a cage for the tapered rollers. Ra is smaller than Rb where Ra represents a radius of curvature of a large end face of the tapered roller and Rb represents a radius of curvature of an end face of a large rib portion of the inner ring.

12 Claims, 8 Drawing Sheets

FOREIGN PATENT DOCUMENTS

| | | |
|---|---|---|
| JP | 9-96352 A | 4/1997 |
| JP | 10-196660 | 7/1998 |
| JP | 11-201151 | 7/1999 |
| JP | 11-210765 A | 8/1999 |
| JP | 2001-65574 | 3/2001 |
| JP | 2001-173665 A | 6/2001 |
| JP | 2002-221223 | 8/2002 |
| JP | 2003-130059 | 5/2003 |
| JP | 2005-172113 | 6/2005 |
| WO | 2005/080813 A1 | 2/2005 |
| WO | WO 2005/100809 A | 10/2005 |
| WO | WO 2005/100809 A1 | 10/2005 |

OTHER PUBLICATIONS

European Search Report dated Feb. 11, 2009.
T.E. Harris: "Rolling Bearing Analysis" 1991, Wiley-Interscience, U.S. 51349, XP002512273 p. 236 and pp. 290-291.
Translation of Japanese Office Action dated Feb. 19, 2010.
Notification of Reason for Refusal dated Dec. 6, 2011, with English translation.

* cited by examiner

TAPERED ROLLER BEARING, TAPERED ROLLER BEARING APPARATUS, AND AUTOMOTIVE PINION SHAFT SUPPORTING APPARATUS UTILIZING SAME TAPERED ROLLER BEARING APPARATUS

BACKGROUND OF THE INVENTION

The present invention relates to a tapered roller bearing which is used in differentials for motor vehicles and industrial machines, a tapered roller bearing apparatus which utilizes the tapered roller bearing and an automotive pinion shaft supporting apparatus which utilizes the tapered roller bearing apparatus.

Since tapered roller bearings are characterized in that they have a high load capacity and a high rigidity, compared to ball bearings, the tapered roller bearings are used in automotive pinion shaft supporting apparatuses in differentials and transaxles of motor vehicles.

In the tapered roller bearing, conventionally, in order to reduce a sliding friction between a large diameter side end face of a tapered roller and a large rib portion of an inner ring so as to reduce the running torque of the tapered roller bearing, the large diameter side end face of the tapered roller was formed into a convexly curved surface. In forming the convexly curved surface, in order to increase the lubricity between the large diameter side end face of the tapered roller and the end face of the large rib portion of the inner ring, the radius of curvature of the large diameter side end face and the radius of curvature of the end face of the large rib portion of the inner ring were normally made to be substantially equal to each other. In machining the tapered rollers, +/−(plus/minus) tolerances were permitted (for example, when Ra represents the radius of curvature of the large diameter side end face, a plus side tolerance permitted was Ra×0.04, while a minus side tolerance permitted was Ra×0.1).

In the aforesaid case, however, when a tapered roller is machined with the plus side tolerance, since a contact position between the large diameter side end face of the tapered roller and the end face of the large rib portion of the inner ring becomes high (the value of e in FIG. 1 increases), the lubricity between the large diameter side end face and the end face of the large rib portion was deteriorated, and as a result, there was caused a problem that the large diameter side end face of the end face of the large rib portion tended to get seized easily.

SUMMARY OF THE INVENTION

The invention was made in view of the situations, and an object thereof is to provide a tapered roller bearing which can increase the lubricity between the large diameter side end face of the tapered roller and the end face of the large rib portion of the inner ring to thereby suppress the occurrence of seizing on the large diameter side end face or the end face of the large rib portion, a tapered roller bearing apparatus utilizing the tapered roller bearing and an automotive pinion shaft supporting apparatus which utilizes the tapered roller bearing apparatus.

According to the invention, there is provided a tapered roller bearing including an outer ring, an inner ring, a plurality of tapered rollers interposed between the outer ring and the inner ring and a cage for the tapered rollers, wherein when Ra represents a radius of curvature of the tapered roller and Rb represents a radius of curvature of an end face of a rib portion at a large diameter end of the inner ring, Ra<Rb.

In the tapered roller bearing of the invention, since the radius of curvature Ra of the large diameter side end face of the tapered roller is made to be smaller than the radius of curvature Rb of the end face of the large rib portion of the inner ring, the contact position between the large diameter side end face of the tapered roller and the end face of the large rib portion of the inner ring can be lowered, so that the lubricity between the large diameter side end face and the end face of the large rib portion is increased, and as a result, the occurrence of seizing on the large diameter side end face or the end face of the large rib portion can be suppressed.

When LWR represents a roller effective length and DW represents a roller mean diameter, a ratio of a roller length to a roller diameter which is expressed by LWR/DW can be made to fall in the range of 1.1 to 1.7. In this case, by making the roller length/roller diameter smaller, the agitation loss of oil and the rolling viscosity are reduced. As a result, the running torque can be reduced.

When RCO represents a crowning radius of the outer ring, LRO represents a raceway length of the outer ring, RCI represents a crowning radius of the inner ring and LRI represents a raceway length of the inner ring, an outer ring crowning parameter (=RCO/LRO) can be 30 to 150, and an inner ring crowning parameter (=RCI/LRI) can be 50 to 260. By setting the crowning parameters in this way, the rolling viscous resistance is reduced.

Respective raceway surfaces of the outer ring and the inner ring and rolling contact surfaces of the tapered rollers are crowned such that a total crowning amount (or depth) (=outer ring crowning amount+inner ring crowning amount+roller crowning amount×2) can be 50 μm or larger, an outer ring crowning rate (=outer ring crowning amount/total crowning amount) can be 40% or larger, and a roller crowing rate (=(roller crowning amount×2)/total crowning amount) can be 20% or smaller. By setting the crowning rates as described above, the rolling viscous resistance is reduced.

In the tapered roller bearing, when d represents an inside diameter of the inner ring and D represents an outside diameter of the outer ring, a roller diameter parameter (2 DW/(D−d)) may be made to fall in the range of 0.44 to 0.52. In this case, when compared to the conventional tapered roller bearing of the same size, the roller diameter is large, and therefore, a free space volume in an interior of the bearing is increased, whereby the flow of oil in the interior of the bearing is facilitated, and the agitation loss is reduced.

A lubricant oil inflow restricting unit for restricting the inflow of an oil may be provided on an axial edge side of the tapered roller bearing. The lubricant oil inflow restricting unit may be such that an annular portion is formed on a small diameter side edge portion of the cage of the tapered roller bearing in such a manner as to extend radially inwards from a position which lies close to the outer ring, and an inner circumferential edge portion of the annular portion so formed is made to approach the inner ring so as to form a labyrinth seal between the inner ring and the annular portion. By providing a separate member which does not make up the tapered roller bearing as the lubricant oil inflow restricting unit, a tapered roller bearing apparatus may be configured. For example, a labyrinth may only have to be provided in a bearing housing.

In this case, the inflow of oil into the interior of the bearing is restricted, whereby the rolling viscous resistance and the agitation loss of oil are reduced. By adopting this configuration, the running torque is reduced.

In the tapered roller bearing, an outer ring raceway angle α may be in the range of 25° to 30°.

In this case, since the pumping action is enhanced to promote the discharge of oil, the agitation loss of oil is reduced, whereby the running torque is reduced.

Additionally, in the tapered roller bearing, an inner ring crowning rate (=inner ring crowning amount/total crowning amount) may be 10% or larger.

In this case, contact loads in the vicinity of axial edge portions of a contact surface between the inner ring raceway surface and the rolling contact surfaces can be reduced, whereby even in case a so-called edge load is applied, the operation thereof is reduced, so that the reduction in the life of the relevant bearing can be prevented.

An automotive pinion shaft supporting apparatus of the invention is such that tapered roller bearings are disposed on a pinion gear side and an opposite side thereto of a pinion shaft, respectively and a tapered roller bearing apparatus having the lubricant oil inflow restricting unit is provided on the pinion gear side.

In the automotive pinion shaft supporting apparatus like this, an inflow of oil in the tapered roller bearing lying on the head side where the inflow of oil is facilitated can be restricted by the lubricant oil inflow restricting unit (for example, a labyrinth seal), so as to reduce the running torque.

According to the tapered roller bearing, the tapered roller bearing apparatus and the automotive pinion shaft supporting apparatus which utilizes the tapered roller bearing of the invention, the lubricity between the large diameter side end face of the tapered roller and the end face of the large rib portion of the inner ring is increased, so that the occurrence of seizing on the large diameter side end face or the end face of the large rib portion can be suppressed.

DETAILED DESCRIPTION OF PREFERRED EMBODIMENTS

Hereinafter, a tapered roller bearing, a tapered roller bearing apparatus and an automotive pinion shaft supporting apparatus according to an embodiment of the invention will be described in detail by reference to the accompanying drawings.

Figure 1:
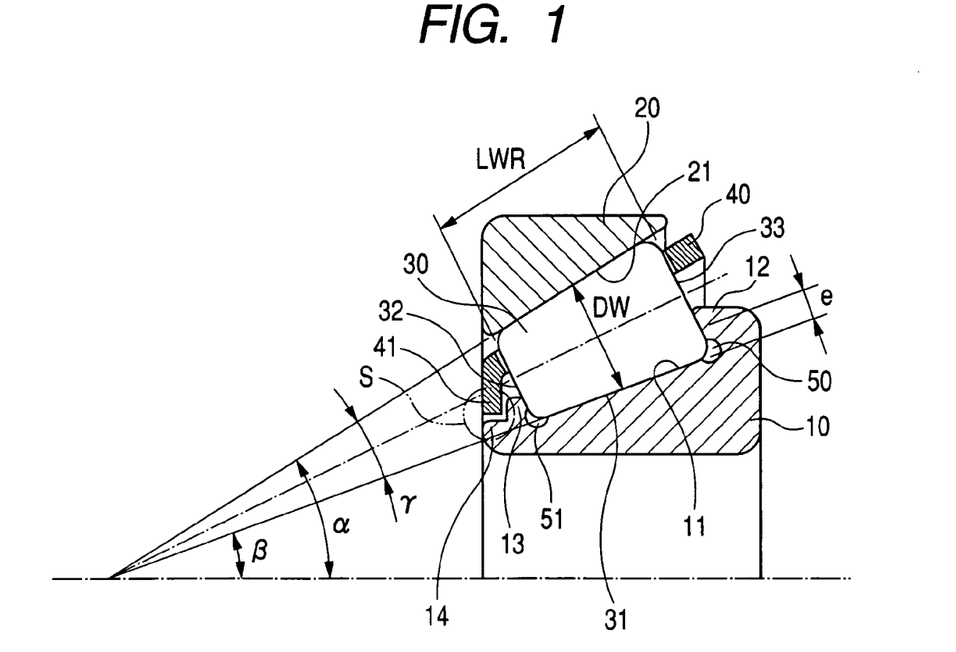
FIG. 1 is an axial sectional view of a tapered roller bearing according to an embodiment of the invention.

FIG. 1 is an axial sectional view of a tapered roller bearing according to an embodiment of the invention. This tapered roller bearing is used on a pinion gear side of an automotive differential as an automotive pinion shaft supporting apparatus and includes an inner ring 10 in which an inner ring raceway surface 11 made up of a coned surface is formed on an outer circumference thereof, an outer ring 20 in which an outer ring raceway surface 21 made up of a coned surface is formed on an inner circumference thereof, a plurality of tapered rollers 30 interposed between the inner and outer rings and each having a rolling contact surface 31 which is made up of a coned surface and is formed on an outer circumference thereof, and a case 40 for retaining these tapered rollers 30 circumferentially at predetermined intervals. A large rib portion 12 and a small diameter rib portion 13 which control the axial movement of the tapered rollers 30 are formed on a large diameter side (right in the figure) and a small diameter side (left in the figure) of the inner ring 10, respectively. Furthermore, recess portions 50, 51 which are made up of notches having arc-shaped cross sections are formed in side end portion of the large rib portion 12 and a small diameter rib portion 13 side end portion of the inner ring raceway surface 11, respectively. The inner ring, the outer ring and the tapered rollers are made of bearing steel, for example.

In this embodiment, a cylindrical portion 14 which is smaller in outside diameter than the small diameter rib portion 13 is formed on a portion which extends from the small diameter rib portion 13 to reach a left edge side of the inner ring. On the other hand, an annular portion 41 is formed on a small diameter side (left in the figure) edge portion of the cage 40 in such a manner as to extend radially inwards from a position lying in the vicinity of the outer ring 20. An inner circumferential edge portion of the annular portion 41 approaches an inner circumferential surface of the cylindrical portion 14 of the inner ring 10 and a side surface of the small diameter rib portion 13, whereby a labyrinth seal S is formed. Since the labyrinth seal S, which is a lubricant oil inflow restricting unit, is formed between the case 40 and the inner ring 10 in this way, an inflow of oil from the left in the figure into the interior of the bearing can be restricted.

Figure 15:
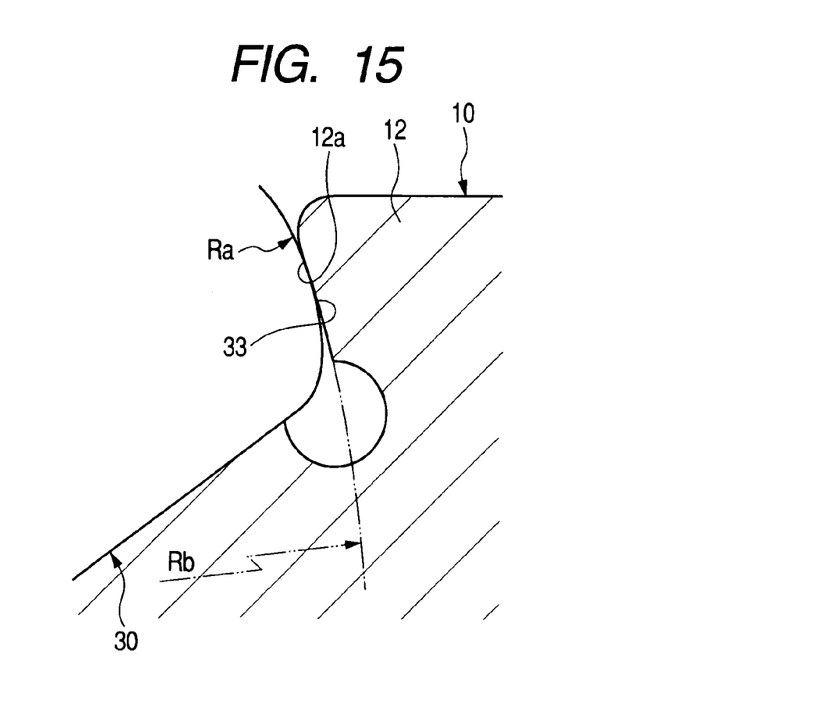
FIG. 15 is a diagram explaining a radius of curvature Ra of a large diameter side end face of the tapered roller and a radius of curvature Rb of an end face of a large rib portion of the inner ring.

In the tapered roller bearing that is configured as described above, when Ra represents a radius of curvature of a large diameter side end face 33 of the tapered roller 30 and Rb represents a radius of curvature of an end face 12a of the large rib portion 12 of the inner ring 10, as is shown in FIG. 15, the invention is characterized by Ra<Rb. By making the radius of curvature Ra of the large diameter side end face of the tapered roller be smaller than the radius of curvature Rb of the end face of the large rib portion of the inner ring, a contact position between the large diameter side end face and the end face of the large rib portion can be lowered, whereby the lubricity between the large diameter side end face and the end face of the large rib portion is improved, and as a result, the occurrence of seizing on the large diameter side end face or the end face of the large rib portion can be suppressed.

In the invention, by controlling crowning amounts of the inner and outer rings or the shape of the tapered roller so as to fall within a predetermined range, the running torque can be reduced.

Namely, while a technique is proposed to reduce the rolling friction by applying crownings to raceway surfaces of the inner and outer rings and rolling contact surfaces of the tapered rollers in order to overcome a drawback that running torque (loss) becomes large in a tapered roller bearing, in the conventionally proposed tapered roller bearing, the increase in the performance of the tapered roller bearing was attempted to be realized by controlling the shape of crownings applied to the raceway surfaces or the rolling contact surfaces. However, no attempt was made to reduce the running torque of the tapered roller bearing by controlling the amount or the like of the crownings applied to the raceways or the rolling contact surfaces by paying attention to the crownings as quantity. On the other hand, a main cause of the running torque of the tapered roller bearing in the differential or the like is the rolling viscous resistance of the tapered rollers and the agitation loss of oil, but no clear guideline was given to how to reduce them.

To cope with this, in the invention, as has been described above, the running torque is reduced effectively by controlling the amount of crownings applied to the inner ring and the outer ring or the shape of the tapered rollers so as to fall within the predetermined ranges.

Here, a general idea on crowning will be described by taking the inner ring as an example.

Figure 2:
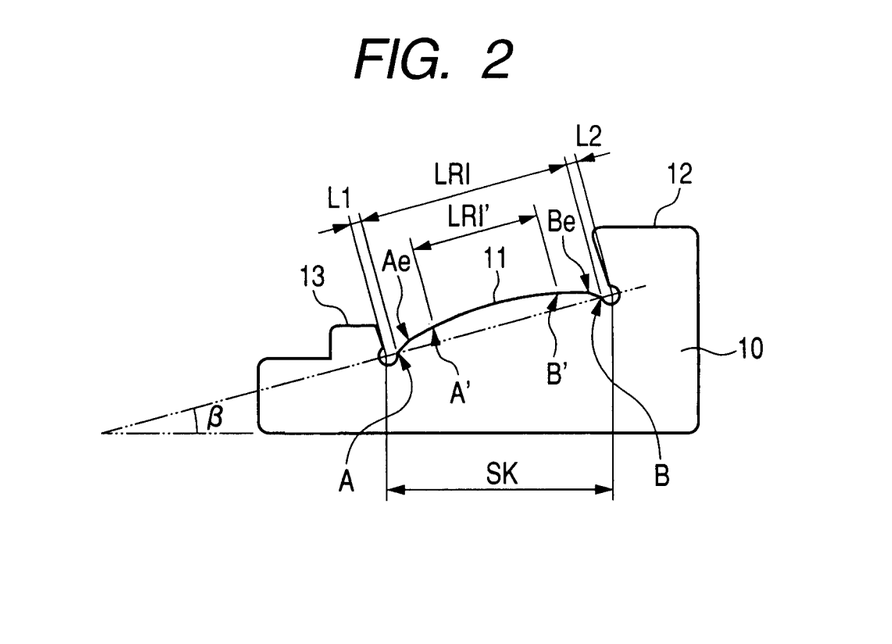
FIG. 2 is a diagram showing a contour and the shape of a crowning (in the case of a composite crowning) of an inner ring.

FIG. 2 is a diagram which shows a contour of an axial section of the inner ring 10 in which the inner ring raceway surface 11 is crowned in an exaggerated fashion. In the figure, a crowning which slightly protrudes radially outwards is applied to the inner ring raceway surface 11 which is brought into contact with the rolling contact surface 31 of the tapered roller 30. This crowning is a composite crowning which is formed into a trapezoidal shape in which an arc is made to constitute an upper side.

Hereinafter, a calculation method of an crowning amount that is applied to the inner ring 10 (hereinafter, also referred to as an inner ring crowning amount) will be described. In FIG. 2, when the width of the inner ring raceway surface 11 with respect to the axial direction of the inner ring 10 is SK, a tapered angle of the inner ring raceway surface 11 is β, and chamfered dimensions shown as formed along both edge portions of the inner ring raceway surface 11 are L1, L2, a raceway length LRI is obtained by the following equation (1):

$$LRI = SK/\cos \beta - (L1+L2) \qquad (1)$$

Here, a length LRI' is defined from a center point of the raceway length LRI as shown in the figure in such a manner that LRI'=0.6LRI, and points on the inner ring raceway surface 11 which correspond to ends of the dimension LRI' are represented by A' and B', respectively. Note that while, in this case, A', B' reside inwards of end points Ae, Be of the arc, respectively, A', B' may coincide with the end points Ae, Be of the arc, respectively.

Figure 3:
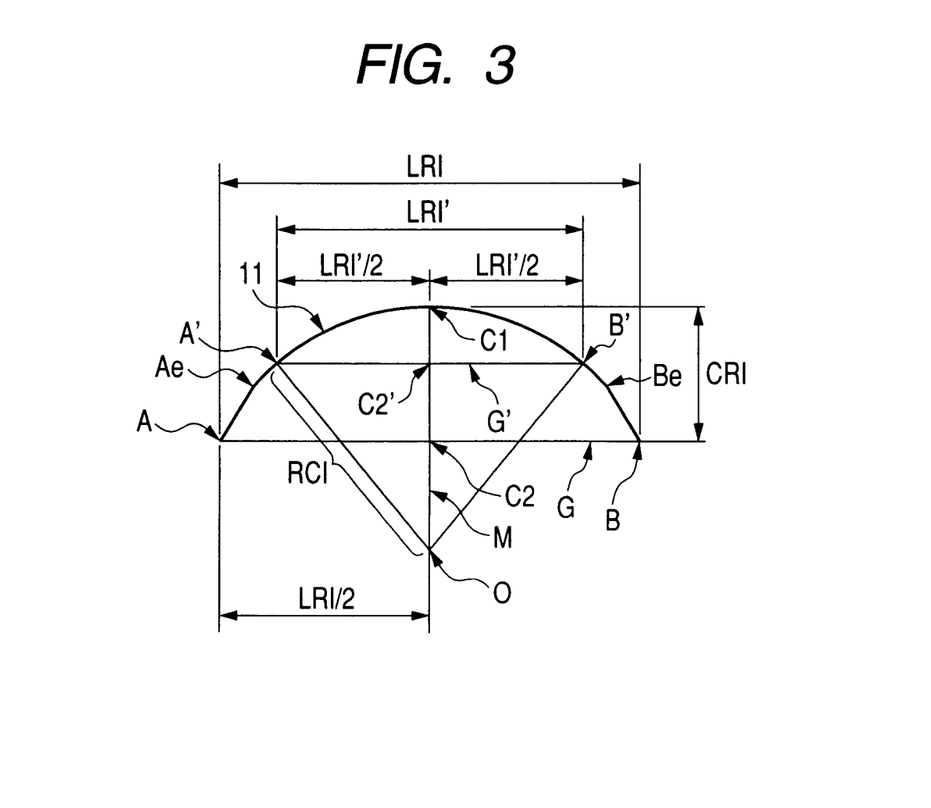
FIG. 3 is a diagram showing exemplarily the shape of the crowning (in the case of the composite crowning) applied to a raceway surface of the inner ring.

FIG. 3 is a diagram which shows exemplarily a section of the crowning between an end point A and an end point B of the raceway length LRI of the inner ring raceway surface 11 shown in FIG. 2. In FIG. 3, a straight line M which passes through a center point C2' of a chord G' of the crowning at the length LRI' and a center O of the arc of the crowning intersects the chord G' at right angles and passes through a central point C1 of the arc of the crowning at the length LRI'. A distance dimension from the central point C1 of the arc of the crowning to a middle point C2 of a chord G of the crowning at the raceway length LRI is represented by the crowning amount CRI of the inner ring 10.

Note that the shape of the inner ring crowning is not limited to the trapezoidal shape in which the arc constitutes the upper side as shown in FIG. 3, and hence, a crowning shape of every kind may be adopted which includes a shape made up of a single arc, a shape made up of a plurality of arcs, a logarithmic crowning, an oval crowning and the like, and the aforesaid concept of the crowning amount can be applied to all those crowning shapes.

The concept of crowning can be applied to the rollers and the outer ring, as well. Furthermore, the definition of the crowning amount can be applied to the rollers and the outer ring.

Note that a crowning made up of a combination of a plurality of shapes within the range of the raceway length (the raceway surface length) is referred to as a composite crowning, and a crowning made up of a single arc shape within the range of the raceway length is referred to as a full crowning.

Next, the concept of crowning and the concept of the crowning amount when an applied crowning is the full crowning will be described.

Figure 4:
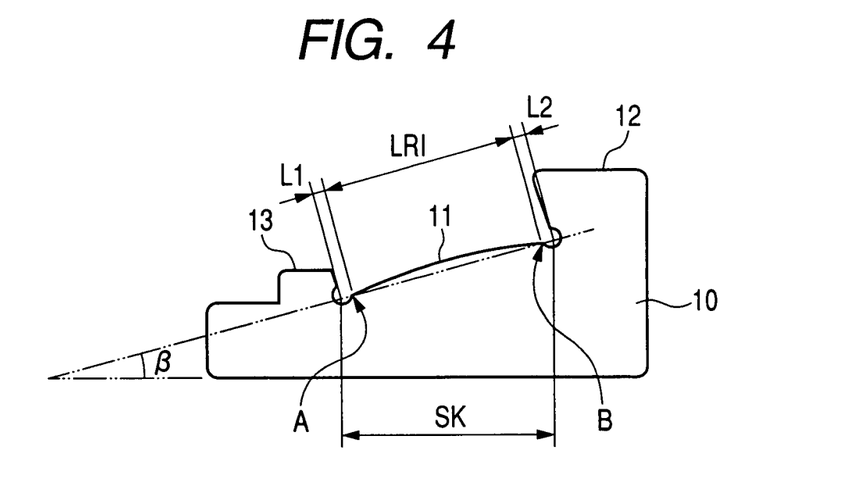
FIG. 4 is a diagram showing a contour and the shape of a crowning (in the case of a full crowning) of the inner ring.

FIG. 4 is a diagram showing a contour of an axial section of the inner ring 10 in which a full crowning is applied to the inner ring raceway surface 11 thereof in such a manner that the contour is distended. In the figure, a raceway length LRI is obtained by the same equation as that used to obtain the LRI of the raceway shown in FIG. 2:

$$LRI = SK/\cos \beta - (L1+L2)$$

Figure 5:
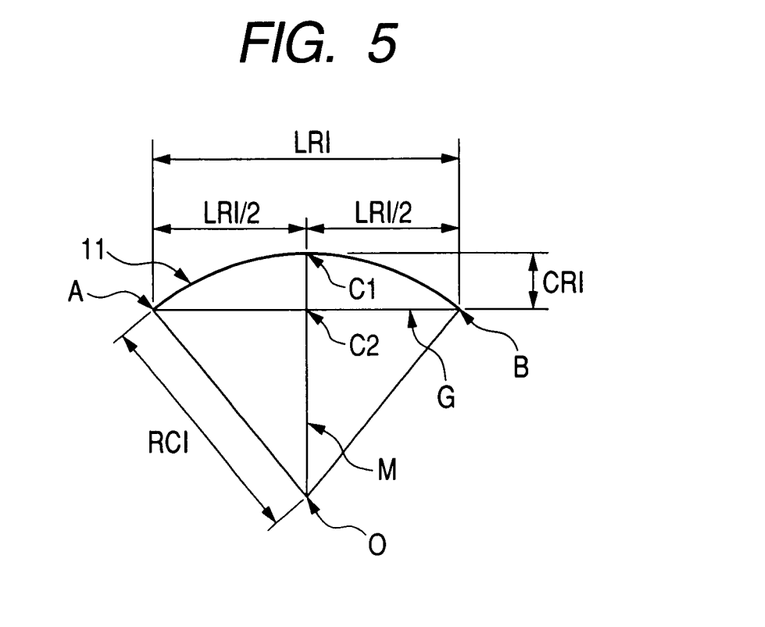
FIG. 5 is a diagram showing exemplarily the shape of the crowning (in the case of the full crowning) applied to the raceway surface of the inner ring.

On the other hand, FIG. 5 is a diagram which shows exemplarily a section of the crowning between an end point A and an end point B of the raceway length LRI of the inner ring raceway surface 11 shown in FIG. 4. In the figure, a straight line M which passes through a middle point C2 of a chord G of the crowning at the length LRI and a center O of an arc of the crowning intersects the chord G at right angles and passes through a central point C1 of the arc of the crowning at the length LRI. A distance dimension defined by the central point C1 of the arc of the crowning and the middle point C2 is represented by an inner ring crowning amount CRI. Namely, assuming that the radius of the crowning arc is RCI as shown in the figure, the inner ring crowning amount CRI is obtained by the following equation (2):

$$CRI = RCI - \{RCI^2 - (LRI/2)^2\}^{1/2} \qquad (2)$$

Figure 6:
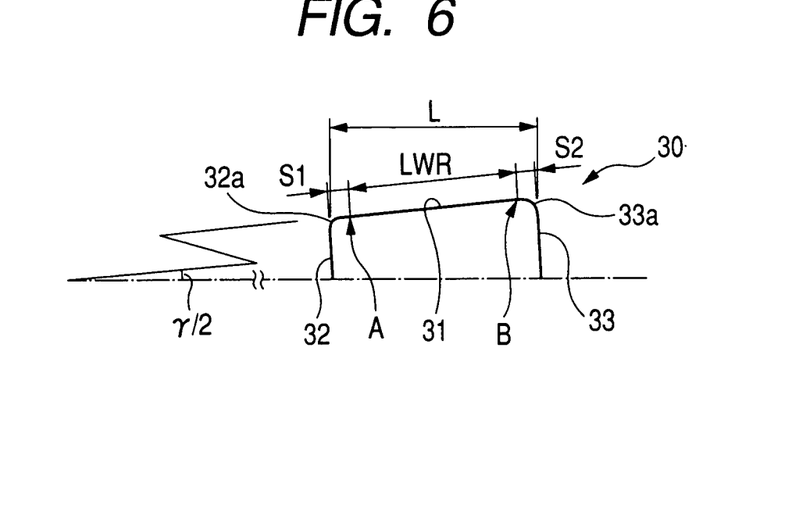
FIG. 6 is a diagram showing a contour of an upper half of a section of a tapered roller and the shape of the crowning thereon.
Figure 7:
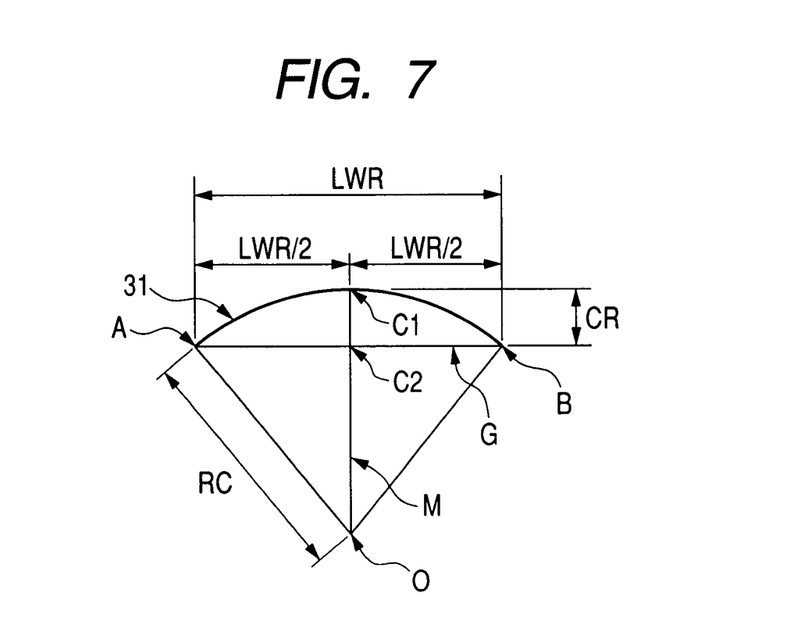
FIG. 7 is a diagram showing exemplarily the shape of the crowning applied to a rolling contact surface of the tapered roller.

FIG. 6 is a diagram which shows a contour of an upper half of an axial section of the tapered roller 30. In FIG. 6, a substantially rectilinear rolling contact surface 31 and chamfered portions 32a, 33a which are formed in such a manner as to slope downwards smoothly from axial edges of the rolling contact surface 31 are provided on an outer circumferential surface of the tapered roller 30. The chamfered portions 32a, 33a are also formed in such a manner as to smoothly continue to the small diameter side end face 32 and the large diameter side end face 33, respectively. The full crowning which slightly protrudes towards an outside diameter direction to the rolling contact surface 31 which appears rectilinear. FIG. 7 is a diagram which shows exemplarily only the shape of the crowning between an end point A and an end point B of an effective length LWR of the rolling contact surface 31 shown in FIG. 6.

In this specification, the crowning amount of the tapered roller 30 (hereinafter, referred to as the roller crowning amount) is regulated as a distance between an arc center point of the crowning which is determined by the roller effective length LWR of the rolling contact surface 31 and a chord thereof. A calculation method of the roller crowning amount will be described below.

In FIG. 6, when L represents a width of the rolling contact surface 31 relative to a center axis direction of the tapered roller 30, γ represents an angle (roller angle) of the rolling contact surface 31, and S1, S2 represent dimensions of illustrated curved surfaces of the chamfered portions 32a, 33a formed at both the edge portions of the rolling contact surface 31, respectively, the aforesaid roller effective length LWR is obtained by the following equation (3):

$$LWR = L/\cos(\gamma/2) - (S1 + S2) \quad (3)$$

A constant width is determined for S1, S2 depending on the size of the bearing.

In FIG. 7, a straight line M which passes through a middle point C2 of the chord G of the crowning for the roller effective length LWR and the center O of the arc of the crowning intersects the chord G at right angles and passes through a central point C1 of the crowning for the roller effective length LWR.

In this specification, a distance between the crowning arch central point C1 and the middle point C2 is defined as a roller crowning amount CR. Namely, when RC represents a radius of the crowning arc as is shown in the figure, the roller crowning amount CR is obtained by the following equation (4):

$$CR = RC - \{RC^2 - (LWR/2)^2\}^{1/2} \quad (4)$$

Figure 8:
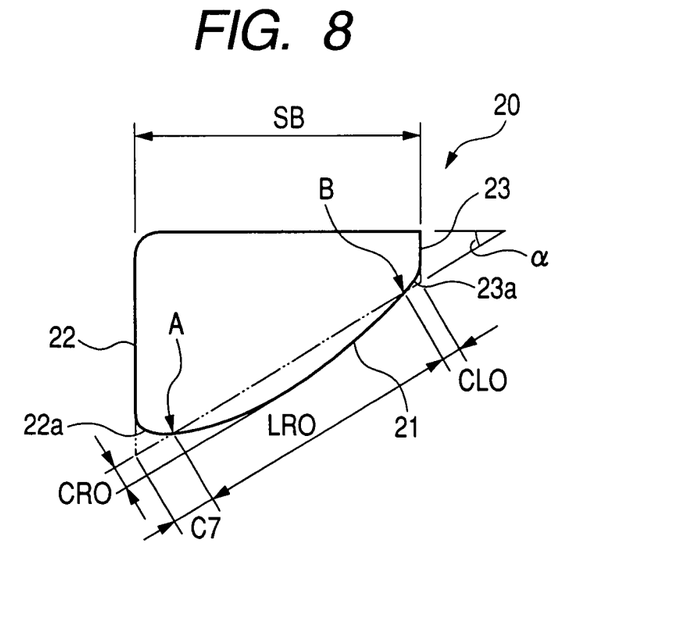
FIG. 8 is a diagram showing a contour and the shape of a crowning of an outer ring.

Next, FIG. 8 is a diagram which shows a contour of an axial section of the outer ring 20 in which a full crowning is applied to the outer ring raceway surface 21 with the crowning exaggerated. In FIG. 8, the outer ring raceway surface 21 is provided on an inner circumferential surface of the outer ring 20 in such a manner as to be brought into rolling contact with the rolling contact surfaces 31 of the tapered rollers 30. A full crowning is applied to the outer ring raceway surface 21 in such a manner as to protrude radially inwards. Chamfered portions 22a, 23a are provided in such a manner as to extend from both edge portions of the outer ring raceway surface 21 towards axial end faces of the outer ring 20, respectively. These chamfered portions 22a, 23a are formed in such a manner as to continue smoothly to a small inside diameter side end face 22 and a large inside diameter side 23 of the outer ring 20, respectively.

In this specification, the amount of crowing of the outer ring 20 (hereinafter, referred to as the outer ring crowning amount) is defined as CRO which is a distance between a central point of an arc of the crowning which is determined by a raceway length LRO of the outer ring 20 and a chord thereof. A calculation method of the outer ring crowning amount CRO will be described below.

In FIG. 8, when SB represents a width of the outer ring raceway surface 21 relative to an axial direction of the outer ring 20, α represents an outer ring raceway angle of the outer ring raceway surface 21, and C7, CLO represent dimensions of illustrated curved surfaces of the chamfered portions 22a, 23a which are formed at both the edge portions the outer ring raceway surface 21, respectively, the aforesaid raceway length LRO is obtained by the following equation (5):

$$LRO = SB/\cos\alpha - (C7 + CLO) \quad (5)$$

Note that in the above equation (5), a constant value is determined for C7, CLO depending on the size of the bearing.

Figure 9:
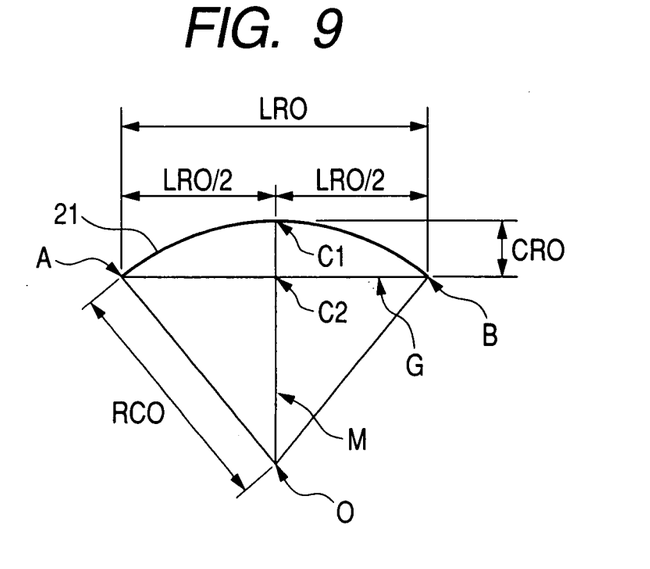
FIG. 9 is a diagram showing exemplarily the shape of the crowning applied to a raceway surface of the outer ring.

On the other hand, FIG. 9 is a diagram which shows exemplarily a sectional shape of the crowning between an end point A and an end point B of the raceway length LRO of the outer ring raceway surface 21 shown in FIG. 8. In FIG. 9, a straight line M which passes through a middle point C2 of the chord G of the crowning for the raceway length LRO and the center O of the arc of the crowning intersects the chord G at right angles and passes through a central point C1 of the crowning for the raceway length LRO.

In this specification, a distance between the crowning arch central point C1 and the middle point C2 is defined as an outer ring crowning amount CRO. Namely, when RCO represents a radius of the crowning arc as is shown in the figure, the roller crowning amount CRO is obtained by the following equation (6):

$$CRO = RCO - \{RCO^2 - (LWR/2)^2\}^{1/2} \quad (6)$$

The crowning amounts of the tapered rollers and the inner and outer rings which are fully crowned can be obtained in the manners described above.

The crowning amounts of the tapered rollers 30 and the inner and outer rings 10, 20 which are fully crowned can, of course, be calculated based on the aforesaid general idea of crownings. Namely, as in the case where the length LRI' is obtained in FIG. 2, LWR' is induced for LWR in the case of the tapered roller 30, and LRO' is induced for LRO in the case of the outer ring 20, and then crowning amounts may only have to be obtained after arc central points have been obtained. The crowning amounts obtained in this way based on the general idea of crownings substantially coincide with the values obtained based on the idea of full crownings (FIGS. 2 to 3).

Next, (RCO/LRO) is defined as an outer ring crowning parameter by the crowning radius RCO and the raceway length LRO of the outer ring 20 which were obtained as has been described above. (RCI/LRI) is defined as an inner ring crowning parameter by the crowning radius RCI and the raceway length LRI of the inner ring 10.

In this specification, a total crowning amount, an outer ring crowning rate, a roller crowning rate and an inner ring crowning rate are calculated from the roller crowning amount, the inner ring crowning amount and the outer ring crowning amount based on the following equations (7), (8), (9), and (10).

Total crowning amount = outer ring crowning amount + inner ring crowning amount + roller crowning amount × 2     (7)

Outer ring crowing rate = outer ring crowning amount / total crowing amount     (8)

Roller crowing rate = (roller crowning amount × 2) / total crowning amount     (9)

Inner ring crowing rate = inner ring crowning amount / total crowning rate     (10)

Next, the results of an investigation will be described which was carried out on a relationship between running torque, the total crowning amount and the individual crowning rates by experimentally measuring running torques of various tapered roller bearings.

Firstly, as a measuring method of running torques of tapered roller bearings, for example, a bearing testing machine was used, and after a tapered roller bearing was set on the testing machine, either of the inner and outer ring was rotated to measure a running torque that was applied to the other of the inner and outer rings. As testing conditions, the tapered roller bearing that is configured as illustrated in the aforesaid embodiment (those corresponding to JIS30306) were used, a differential gear oil was used as a lubricant, an axial load of 4 kN was applied as an artificial preload load, and the rings were rotated at two rotational speeds of 300 [r/min] and 2000 [r/min].

As lubricating conditions during the experiment, in the case of the rotational speed or 300 [r/min], only the lubricant at the normal temperature was applied in a proper amount prior to the experiment, and the experiment was carried out with no additional lubricant applied. On the other hand, in the case of the rotational speed of 2000 [r/min], the experiment was carried out while supplying the lubricant which was heated to an oil temperature of 323K (50° C.) 0.5 liter per minute in a cyclic fashion. The reason the different supplying methods of the lubricant were used was that a running torque resulting from rolling friction could be extracted by supplying the lubricant in amounts which were necessary and minimum for the respective rotational speeds so as to eliminate as much as possible the agitation loss of the lubricant which would otherwise be generated by an excessive supply of the lubricant. The tapered roller bearings that were prepared for use for the experiment were such that their total crowning amounts and crowning rates were set differently, and running torques were measured on the tapered roller bearings so prepared, respectively, so as to grasp the relationship between the total crowing amount and the crowning rates and the running torque, whereby a range of values was specified which could reduce the running torque.

Figure 10:
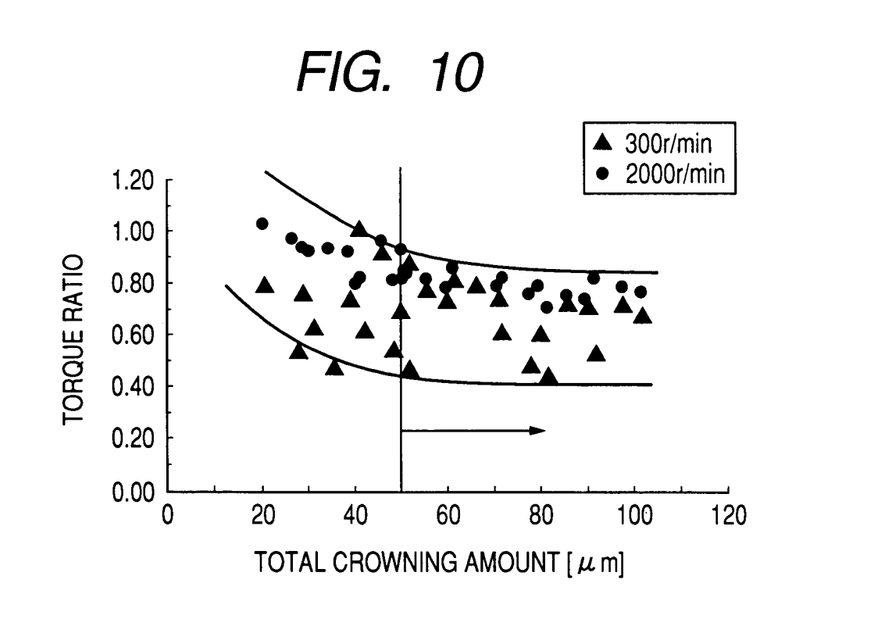
FIG. 10 is a scatter diagram showing a relationship between a total crowning amount and torque ratios of tapered roller bearings.

FIG. 10 is a scatter diagram which shows a relationship between the total crowning amount and torque ratios (running torque/predetermined value) of the measured tapered roller bearings. As is obvious from the graph, in the event that the total crowning amount is smaller than 50 μm, the torque ratios scatter in a wide width, but as the total crowning amount increases, there is indicated a tendency that a maximum value of the scattering torque ratios gradually decreases. It is seen that in the event that the total crowning amount reaches or exceeds 50 μm, compared to the case where the total crowning amount is smaller than 50 μm, the torque ratios are stably distributed within a range of smaller values. When the total crowing amount exceeds 100 μm, the behaviors of the tapered rollers became unstable, and the torque increases. Consequently, the total crowning amount is desirably 100 μm or smaller.

Figure 11:
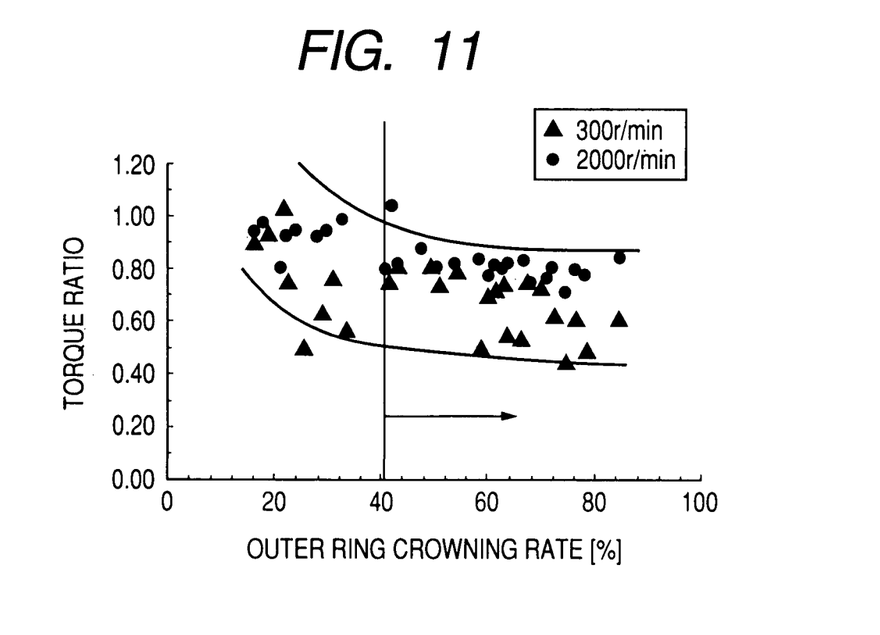
FIG. 11 is a scatter diagram showing a relationship between an outer ring crowning rate and the torque ratios of the tapered roller bearings.

Next, FIG. 11 is a scatter diagram which shows a relationship between the outer ring crowning rate and the torque ratios of the tapered roller bearings. As is obvious from the graph, in the event that the outer ring crowning rate is smaller than 40%, there is indicated a tendency that a maximum value of the torque ratios gradually decreases as the outer ring crowning rate increases. It is seen that in the event that the outer ring crowning rate is 40% or larger, compared to the case where the outer ring crowning rate is smaller than 40%, the torque ratios are stably distributed within a range of smaller values. Note that when the outer ring crowning rate exceeds 85%, in the event that an edge load is applied between the inner ring and the roller, a reduction in life is called for. Consequently, the outer ring crowning rate is desirably 85% or smaller.

Figure 12:
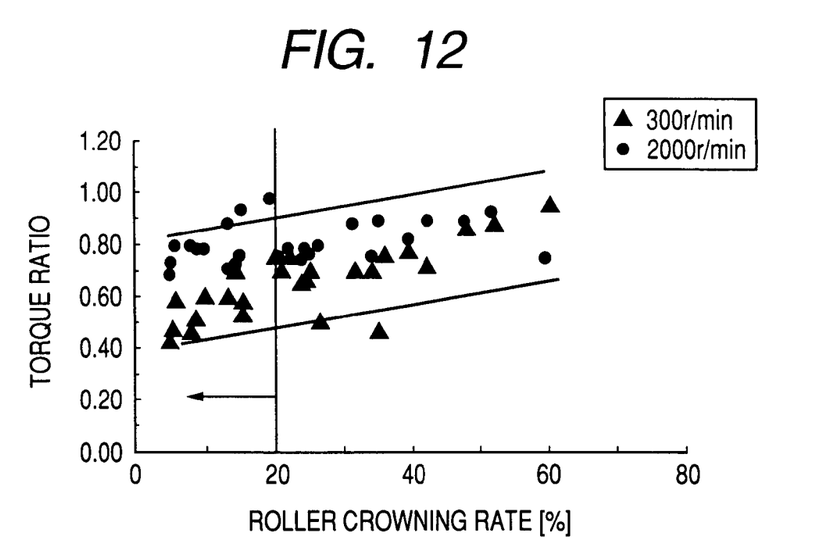
FIG. 12 is a scatter diagram showing a relationship between a roller crowning rate and the torque ratios of the tapered roller bearings.

FIG. 12 is a scatter diagram which shows a relationship between the roller crowning rate and the torque ratios of the tapered roller bearings. As is clear from the graph, in the event that the roller crowning rate is larger than 20%, there is indicated a tendency that a maximum value of roller crowning rates gradually decreases as the roller crowning rate decreases. It is seen that in the event that the roller crowning rate is 20% or smaller, torque values are stably distributed in a range of smaller values, compared to the case where the roller crowning rate is larger than 20%. When the roller crowning rate becomes smaller than 5%, a torque increase due to an increase in contact area and a decrease in life due to the occurrence of an edge load are called for. Consequently, the roller crowning rate is desirably 5% or larger.

Figure 13:
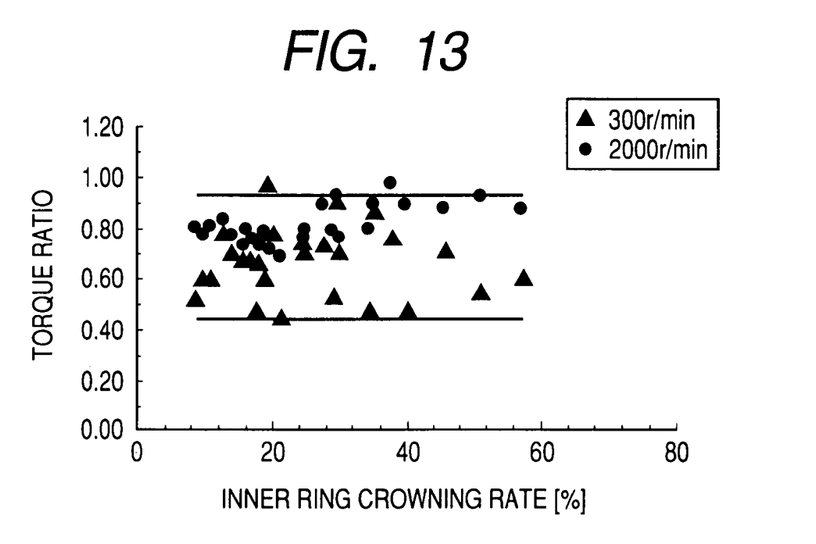
FIG. 13 is a scatter diagram showing a relationship between an inner ring crowning rate and the torque ratios of the tapered roller bearings.

FIG. 13 is a scatter diagram which shows a relationship between the inner ring crowning rate and torque ratios of the tapered roller bearings. As is obvious from the graph, torque ratios are stable in a substantially constant range while the inner ring crowning rate changes. Namely, no remarkable correlation with the torque ratios of the tapered roller bearings was identified. However, by setting the inner ring crowning rate to 10% or larger, contact loads in the vicinity of both the axial edge portions of the contact surface between the inner ring raceway surface 11 and the rolling contact surfaces 31 can be decreased, whereby even in the event that an edge load is applied, the operation thereof can be decreased, thereby making it possible to prevent the reduction in life of the tapered roller bearing. When the inner ring crowning rate is made to be larger than 55%, the outer ring crowing rate is increased due to the relationship with the total crowning amount, and the torque increases. Consequently, the inner crowning rate is desirably 55% or larger.

Thus, as has been described heretofore, as a result of the investigation carried out by experimentally measuring the relationship between the torque ratios or running torques of the tapered roller bearings and the total crowning amount and the individual crowning rates, a knowledge was obtained that the running torques of the tapered roller bearings could be reduced by fulfilling the conditions that the total crowning amount was 50 μm, the outer ring crowning rate was 40% or larger and the roller crowning rate was 20% or smaller.

When calculating crowning parameters in the aforesaid experiment, it was found out that the reduction in running torque could be realized by an outer ring crowning parameter (RCO/LRO) of 30 to 150 and an inner ring crowning parameter (RCI/LRI) of 50 to 260.

Furthermore, it was found that the roller length/roller diameter (LWR/DW) was preferably set to 1.1 to 1.7. The reason a lower limit was set to 1.1 is that when the roller length/roller diameter (LWR/DW) decreases below this limit value, the roller diameter increases, which increases the rolling viscous resistance. The reason an upper limit was set to 1.7 is that when the roller length/roller diameter (LWR/DW) exceeds this value, the roller diameter decreases, which decreases the load capacity.

On the other hand, with respect to the roller diameter parameter (2 DW/(D-d)), it was found that the parameter was preferably set to 0.44 to 0.52. The reason a lower limit was set to 0.44 is that when the roller diameter parameter (2 DW/(D-d)) decreases below this value, the free space volume in the interior of the bearing decreases, and hence, the oil is made difficult to flow, whereby the reduction effect of the oil agitation loss becomes insufficient. The reason an upper limit was set to 0.52 is that when the roller diameter parameter (2 DW/(D-d)) exceeds this value, the roller diameter becomes too large relative to the bearing size (inner and outer ring diameters), and the balance in the configuration of the whole bearing becomes undesirable, whereby the application thereof to general equipment becomes difficult.

It was found out that the outer ring raceway angle a worked effectively to reduce the running torque when it was in the range of 25° to 30°.

Figure 14:
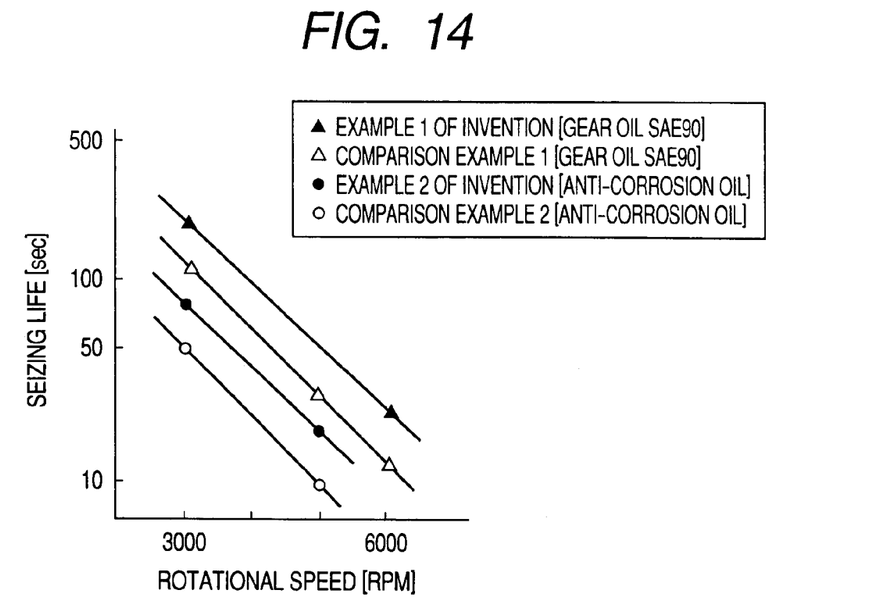
FIG. 14 is a graph showing the seizing life of tapered roller bearings according to examples of the invention or comparison examples.

Next, an investigation experiment was carried out on tapered roller bearings which fulfilled the conditions of the crowning amounts or crowning parameters and in which when Ra represents the radius of curvature of the large diameter side end face of the tapered roller and Rb represents the radius of curvature of the end face of the large rib portion of the inner ring, Ra<Rb. FIG. 14 is a graph which shows the seizing life of the tapered roller bearing of the invention. Tapered roller bearings used for the experiment, whether examples of the invention or comparison examples, were prepared to such conditions that the bearing inside diameter d=30 mm, bearing outside diameter D=74 mm, and assembled width T=24 mm. The axial load was 1000 kgf, and the experiment was carried out by initially applying an oil with no additional oil applied any longer.

As is clear from FIG. 14, according to the tapered roller bearing of the invention, the seizing life can be extended largely even under such conditions as oil supply delay and lubrication failure.

What is claimed is:

1. A tapered roller bearing comprising:
   an outer ring;
   an inner ring;
   a plurality of tapered rollers interposed between the outer ring and the inner ring; and
   a cage for the tapered rollers,
   wherein Ra is smaller than Rb where Ra represents a radius of curvature of a large end face of the tapered roller and Rb represents a radius of curvature of an end face of a large rib portion of the inner ring,
   wherein RCO/LRO is within a range of 30 to 150, and RCI/LRI is within a range of 50 to 260 where RCO represents a crowning radius of the outer ring, LRO represents a raceway length of the outer ring, RCI represents a crowning radius of the inner ring and LRI represents a raceway length of the inner ring,
   wherein a crown of each of raceway surfaces of the inner and outer rings has a vertex of the crown located at a center of the raceway length of each of the raceway surfaces of the inner and outer rings, and
   wherein a crown of a rolling contact surface of the tapered roller has a vertex of the crown located at a center of a roller effective length of the rolling contact surface.

2. The tapered roller bearing according to claim 1, wherein LWR/DW is within a range of 1.1 to 1.7 where LWR represents the roller effective length of the tapered roller and DW represents a roller mean diameter of the tapered roller.

3. The tapered roller bearing according to claim 2, wherein the raceway surfaces of the outer ring and the inner ring and rolling contact surfaces of the tapered rollers are crowned such that:
   a total crowning amount, which is a sum of outer ring crowning amount, inner ring crowning amount and two times of roller crowning amount, is 50 μm or larger,
   an outer ring crowning rate, which is a rate of the outer ring crowning amount on the total crowning amount, is 40% or larger, and
   a roller crowning rate, which is a rate of two times of the roller crowning amount on the total crowning amount is 20% or smaller.

4. The tapered roller bearing according to claim 1, wherein 2DW/(D-d) is within a range of 0.44 to 0.52 where DW represents a roller mean diameter of the tapered roller, d represents a bore diameter of the inner ring and D represents an outside diameter of the outer ring.

5. The tapered roller bearing according to claim 1, wherein a raceway angle α of the outer ring is within a range of 25° to 30°.

6. The tapered roller bearing according to claim 1, wherein an inner ring crowning rate, which is a rate of the inner ring crowning amount on the total crowning amount, is 10% or larger.

7. A tapered roller bearing apparatus comprising:
   a tapered roller bearing according to claim 1; and
   a lubricating oil inflow restricting unit that restricts inflow of an oil and is provided on an axial edge side of the tapered roller bearing between the inner and outer rings.

8. The tapered roller bearing apparatus according to claim 7, wherein the lubricating oil inflow restricting unit includes an annular portion formed on a small diameter side edge portion of the cage so as to extend radially inward from a position which lies close to the outer ring, and an inner circumferential edge portion of the annular portion approaches the inner ring so as to form a labyrinth seal between the inner ring and the annular portion.

9. An automotive pinion shaft supporting apparatus in which tapered roller bearings are disposed on a pinion gear side and an opposite side thereto of a pinion shaft, respectively, and the tapered roller bearing apparatus on the pinion gear side is a tapered roller bearing apparatus according to claim 7.

10. The tapered roller bearing according to claim 1, wherein the crown of the raceway surface of the inner ring comprises a trapezoidal shape.

11. The tapered roller bearing according to claim 1, wherein the crown of the raceway surface of the inner ring comprises a full crown.

12. The tapered roller bearing according to claim 1, wherein the crown of the raceway surface of the inner ring comprises a composite crown.

* * * * *